(12) United States Patent
Stern et al.

(10) Patent No.: US 10,748,191 B2
(45) Date of Patent: Aug. 18, 2020

(54) SYSTEMS AND METHODS FOR DETECTING AND TRACKING CUSTOMER INTERACTION

(71) Applicant: CAPITAL ONE SERVICES, LLC, McLean, VA (US)

(72) Inventors: Matthew Stern, San Francisco, CA (US); Jason Deperro, San Mateo, CA (US); Dan Makoski, Palo Alto, CA (US); Makiko Taniguchi, San Francisco, CA (US)

(73) Assignee: Capital One Services, LLC, McLean, VA (US)

( * ) Notice: Subject to any disclaimer, the term of this patent is extended or adjusted under 35 U.S.C. 154(b) by 825 days.

(21) Appl. No.: 14/973,220

(22) Filed: Dec. 17, 2015

(65) Prior Publication Data

US 2016/0180404 A1    Jun. 23, 2016

Related U.S. Application Data

(60) Provisional application No. 62/094,704, filed on Dec. 19, 2014.

(51) Int. Cl.
*G06Q 30/02* (2012.01)
*H04L 29/08* (2006.01)

(52) U.S. Cl.
CPC ..... *G06Q 30/0269* (2013.01); *G06Q 30/0261* (2013.01); *H04L 67/18* (2013.01); *H04L 67/22* (2013.01)

(58) Field of Classification Search
CPC .................................................. G06Q 30/0261
See application file for complete search history.

(56) References Cited

U.S. PATENT DOCUMENTS

| 6,519,571 B1* | 2/2003 | Guheen | G06Q 30/02 |
| | | | 705/14.66 |
| 9,094,257 B2* | 7/2015 | Morrill | H04L 29/06027 |

(Continued)

OTHER PUBLICATIONS

Hub, A., Hartter, T. and Ertl, T., Oct. 2006. Interactive tracking of movable objects for the blind on the basis of environment models and perception-oriented object recognition methods. In Proceedings of the 8th international ACM SIGACCESS conference on Computers and accessibility (pp. 111-118). (Year: 2006).*

*Primary Examiner* — Luis A Brown
*Assistant Examiner* — Robert C Johnson
(74) *Attorney, Agent, or Firm* — Pillsbury Winthrop Shaw Pittman LLP

(57) ABSTRACT

A server system is provided for analyzing user interaction in an environment. The server system comprises a memory storing a set of instructions and a processor configured to execute the instructions to perform operations including determine a user has interacted with an item positioned in the environment based on a communication signal received from a hub physically located in the environment indicating an item tag associated with the item is linked with a user tag associated with the user. The server system may identify, based on one or more communication signals received from the hub, at least one metric associated with the user's interaction with the item and compare the at least one metric with a set of rules associated with the type of metric. The server system may provide an indication, based on the comparison, to a display device.

20 Claims, 8 Drawing Sheets

(56) References Cited

U.S. PATENT DOCUMENTS

| | | | |
|---|---|---|---|
| 2008/0248815 A1* | 10/2008 | Busch | G06Q 30/0233 |
| | | | 455/456.5 |
| 2010/0190510 A1* | 7/2010 | Maranhas | G06Q 10/02 |
| | | | 455/456.1 |
| 2010/0198626 A1* | 8/2010 | Cho | G06Q 10/02 |
| | | | 705/5 |
| 2011/0022474 A1* | 1/2011 | Jain | G06Q 30/02 |
| | | | 705/14.66 |
| 2011/0072132 A1* | 3/2011 | Shafer | G08B 13/2402 |
| | | | 709/224 |
| 2011/0178863 A1* | 7/2011 | Daigle | G06Q 30/0231 |
| | | | 705/14.31 |

\* cited by examiner

SYSTEMS AND METHODS FOR DETECTING AND TRACKING CUSTOMER INTERACTION

PRIORITY CLAIM

This application claims priority under 35 U.S.C. § 119 to U.S. provisional patent application No. 62/094,704, filed on Dec. 19, 2014, titled "Systems and Methods for Detecting and Tracking Customer Interaction." The aforementioned application is incorporated herein by reference in its entirety.

BACKGROUND

Brick-and-mortar merchants typically rely on customer sales to maintain an operating business. Thus, merchants may allocate significant time, energy and money toward various systems and methods to maximize their sales. Merchants may rely on advertisements, promotions, or offers, and strategic displays, product placement, and physical layout of a store to enhance consumer experience and increase sales. Many other techniques have also been used.

There are entities who study consumer behavior to learn and share advanced techniques to determine how to improve sales. Merchants typically consult with these entities or studies conducted by these entities to determine how they may be able to improve their own sales. Some studies, however, may not be useful to all merchants, as some merchants have unique needs or particular clientele etc. Additionally, a detailed study specific to a particular merchant may be cost prohibitive and therefor unavailable to many merchants, or may be useful only for a limited duration as merchant techniques evolve and develop. And some studies may rely on methods that may not effectively determine how users actually engage with a merchant. Many studies, for instance, may rely on active user participation and user response regarding a particular experience. User response may not be reflective of a true user experience, however, as the user may be unaware of the influence of certain techniques. These studies, thus, may be ineffective to analyze actual user behavior or interaction with a merchant and the various items for sell.

Current computing systems and supporting infrastructures are ill-equipped to address these and similar issues.

SUMMARY

The disclosed embodiments may include server system for analyzing user interaction in an environment. The server system comprises a memory storing a set of instructions and a processor configured to execute the instructions to perform operations including determine a user has interacted with an item positioned in the environment based on a communication signal received from a hub physically located in the environment indicating an item tag associated with the item s linked with a user tag associated with the user. The server system may identify, based on one or more communication signals received from the hub, at least one metric associated with the user's interaction with the item and compare the at least one metric with a set of rules associated with the type of metric. And based on the comparison, the server system may provide an indication to a display device.

In another embodiment, a system for sensing user interaction with one or more items in an environment comprises at least one item tag associated with at least one item, the item tag being configured to indicate identification information corresponding to the at least one item, and at least one hub physically located in the environment configured to provide a sensor network, the at least one hub being configured to detect, via the sensor network, the at least one item tag and receive identification information of the at least one item tag. The hub is further configured to detect, via the sensor network, at least one user tag and receive user identification information of a user associated with the user tag and to determine when a user tag is positioned in close proximity to an item tag. The system also includes a server system comprising a memory storing a set of instructions and at least one processor configured to execute one or more of the set of instructions to determine that a user has interacted with an item positioned in the environment based on a communication signal received from the at least one hub, the communication signal indicating a user tag associated with the user is in close proximity to an item tag associated with the item. The server system may also identify, based on one or more communication signals received from the at least one hub, at least one metric associated with the user's interaction with the item, compare the at least one identified metric with a set of rules associated with the metric, and provide to at least one of a client device associated with the user or an interface associated with the server system, an indication concerning the user's interaction based on the comparison.

Aspects of the disclosed embodiments may include tangible computer-readable media that stores software instructions that, when executed by one or more processors, are configured to and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

While the following discussion is directed to services in a retail or merchant environment, discussion of these services and environments are made by example only. The system and methods discussed herein may be just as applicable in other environments that may benefit from the ability to track a user or consumer s interaction and/or provide services to the user based on the interaction with an item or a point of interest, such as a warehouse, factory, convention center etc.

Figure 1:
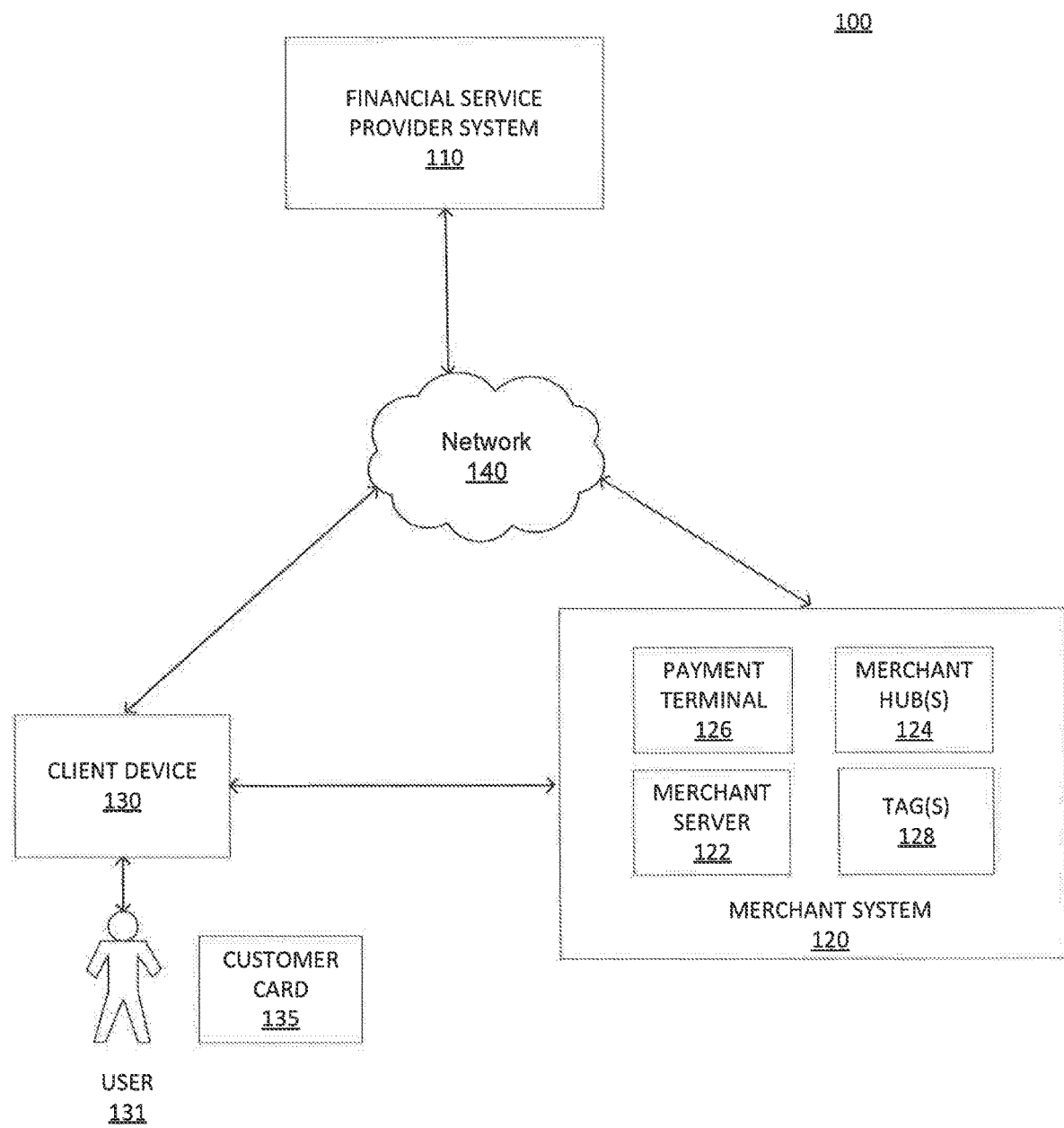
FIG. 1 is a block diagram of an exemplary system, consistent with disclosed embodiments.

FIG. 1 is a block diagram of an exemplary system 100 for performing one or more operations consistent with the disclosed embodiments. In one embodiment, system 100 may include one or more financial service provider (FSP) system 110, one or more merchant systems 120, one or more client devices 130, one or more customer cards or user tags 135, and network 140. The components and arrangement of the components included in system 100 may vary. Thus, system 100 may include other components that perform or assist in the performance of one or more processes consistent with the disclosed embodiments.

Components of system 100 may be configured to provide an enhanced consumer experience as determined by an interaction between a customer card (user tag) 135 carried on a user 131 and a plurality of inventory or other items associated with a tag 128. A communication network for enabling communications between customer card 135, tag 128, and merchant system 120 may be provided by a merchant hub 124. These and other components of system 100 may enable a merchant to detect and analyze a consumer's engagement with the merchant and its inventory and improve the consumer experience, consistent with disclosed embodiments.

As further described herein, merchant system 120 may track the location of a user (e.g., by tracking the location of customer card 135 carried by user 131) and report a customer's interaction with a store item of the merchant (e.g., by detecting engagement of user 131 with an item associated with a tag 128). Information regarding a user's 131 interaction with an item may be received, tracked, and analyzed by a merchant server 122. Merchant server 122 may also be configured to provide item specific information to a user (e.g. by communicating with a client device 130) based on the user's interaction with an item. Merchant system 120 may also use a payment terminal 126 to engage in a purchase transaction with a user 131 based on detection of certain items via one or more tags 128 and authenticate purchase information with an FSP 110.

Components of system 100 may include one or more computing devices (e.g., computer(s), server(s), etc.), memory storing data and/or software instructions (e.g., database(s), memory devices, etc.), and other known computing components. In some embodiments, the one or more computing devices may be configured to execute software instructions stored on one or more memory devices to perform one or more operations consistent with the disclosed embodiments. Other components of system 100, such as product tag(s) 128 and customer card 135, may include passive components having no integrated power source. FSP system(s) 110, merchant system(s) 120, and client device(s) 130 may be configured to communicate with one or more other components of system 100. In certain aspects, users may operate one or more components of system 100 to receive communications, initiate operations, and/or provide input for one or more operations consistent with the disclosed embodiments.

FSP system 110 may be a financial service entity that provides, maintains, manages, or otherwise offers financial services. For example, the financial service entity may be a bank, credit card issuer, or any other type of financial service entity that generates, provides, manages, and/or maintains financial service accounts for one or more users. Financial service accounts may include, for example, credit card accounts, loan accounts, checking accounts, savings accounts, reward or loyalty program accounts, and/or any other type of financial service account known to those skilled in the art. In providing, maintaining, managing or otherwise offering financial services, FSP system 110 may be enabled to authenticate financial transactions associated with a financial service account. FSP system 110 may include infrastructure and components that are configured to generate and/or provide financial service accounts such as credit card accounts, checking accounts, debit card accounts, loyalty or reward programs, lines of credit, and the like.

In one aspect, FSP system 110 may be one or more computing devices configured to perform one or more operations consistent with disclosed embodiments. In one aspect, FSP system 110 may be one or more servers. FSP system 110 may include one or more processors configured to execute software instructions stored in a memory or other storage device. The one or more processors may be configured to execute software instructions that, when executed by a processor, performs Internet-related communication, financial service-based processes, and authentication services for enabling consumer transactions. For instance, FSP system 110 may execute software that provides data used for generating and displaying interfaces, including content for a display device included in, or connected to, client device 130. In some embodiments, financial service provider 110 may provide one or more web sites or online portals that are accessible by client device 130 and/or merchant system 120 over network 140. The disclosed embodiments are not limited to any particular configuration of FSP system 110.

Merchant system 120 may be an entity that offers goods, services, and/or information, such as a retailer (e.g., Macy's®, Target®, etc.), grocery store, or any other type of entity that offers goods and/or services that consumers may purchase. In one example, merchant system 120 may be associated with a merchant brick and mortar location(s) that a consumer (e.g., a user 131) may physically visit and purchase a product or service. Merchant system 120 may also include a warehouse or factory or other entity including a plurality of items, products or other points of interaction that may benefit from the ability to track a user location and a user's engagement with an item or point of interest. Merchant system 120 may also include back- and/or front-end computing components, such as merchant server system 122 that store data and execute software instructions to perform operations consistent with disclosed embodiments and computers that are operated by employees of the merchant (e.g., back office systems, etc.).

Merchant system 120 may include one or more merchant server systems 122, payment terminal 126, merchant hubs 124, and product tags 128. Merchant servers 122 may include one or more computing systems configured to execute stored software instructions to perform operations associated with a merchant, including one or more processes associated with tracking and analyzing user interaction with physical items of the merchant, processing purchase transactions, generating transaction data, generating product data (e.g., SKU data) relating to purchase transactions, etc.

Merchant hub(s) 124 may include one or more computing systems configured to execute stored software instructions to perform operations associated with monitoring customer interactions with store items within a merchant store. For example, merchant hub(s) 124 may be configured to monitor the location of customer card 135 carried by user 131 and product tag(s) 128 affixed to store items within a merchant store, and determine when a customer has interacted with the store item, such as by picking up the store item. Merchant hub(s) 124 may also include various components and circuitry configured for enabling an in-store hub network that enables the monitoring of the location of customer card 135 and a user's interaction with a store item.

Payment terminal 126 may be one or more computing devices configured to perform one or more operations consistent with conducting sales transactions associated with merchant system 120. For example, payment terminal 126 may comprise one or more point-of-sale (POS) terminals configured to accept payment from user 131 associated with the sale of a merchant store item and perform other steps for completing a purchase transaction.

Product tag(s) 128 may be affixed to store items and may comprise one or more components configured to generate a signal detectible by merchant hub(s) 124. For example, product tag(s) 128 may comprise a label that includes technology, including circuitry or other components, to allow merchant hub(s) 124 to track the location of the product tag(s) 128 within a retail or other environment including technology associated with using, for example, near field communication (NFC), RFID, infrared, electric fields, magnetic fields, WiFi, Bluetooth, etc. In some embodiments, product tag 128 may instead be associated with a point of interest, and may be affixed to a shelf or display or otherwise positioned to detect user interaction (such as in the floor or a wall). In some embodiments, product tag(s) 128 may be a passive, low-power device having no internal power source. In the disclosed embodiments, product tags 128 may be affixed to the plurality of items via any known method including a label gun or other device that enables merchant to provide a tag 128 on a plurality of items 123.

Client device 130 may be one or more computing devices configured to perform one or more operations consistent with disclosed embodiments. In some embodiments, client device 130 may be a mobile device (e.g., tablet, smart phone, etc.). Client device 130 may include one or more processors configured to execute software instructions stored in memory, such as memory included in client device 130. Client device 130 may include software that when executed by a processor performs known Internet-related communication, content display processes, and financial service-related processes for a user 131 of client device 130. For instance, client device 130 may execute browser or related mobile display software that generates and displays interfaces including content on a display device included in, or in communication with, client device 130. Client device 130 may be a mobile device that executes mobile device applications and/or mobile device communication software that allows client device 130 to communicate with a FSP system 110 or merchant system 120 and other components over network 140, and generates and displays content in interfaces via a display device included in client device 130. The disclosed embodiments are not limited to any particular configuration of client device 130.

For instance, client device 130 may be a mobile device that stores and executes mobile applications that provide financial service-related functions offered by the financial service entity associate with FSP system 110, such as a mobile banking application for checking balances, paying bills, performing financial transactions, budgeting, receiving marketing messages, etc. Client device 130 may also store and execute other mobile applications that provide functions related to a merchant experience, such as by providing product information or assistance or other information related to a user's experience with a merchant system, based in part on a user's interaction with one or more items of a merchant system 120.

Customer card 135 may comprise a financial services product associated with financial service accounts of user 131, such as a financial card, key fob, smartcard, etc. For example, customer card 135 may comprise a credit card, debit card, or any other financial card associated with conducting financial transactions. In some embodiments, customer card 135 may comprise a digital wallet such that, for example, client device 130 is customer card 135. In other embodiments, customer card 135 need not comprise a financial services product at all. Customer card 135 may be any device configured to communicate with a merchant hub 124 in the disclosed embodiments and may be incorporated as part of client device 130. Customer card 135 is not limited to a card configuration and may be provided in any form capable of being configured to perform the functionality of the disclosed embodiments. In some embodiments, customer card 135 may also include any wearable item, including jewelry, or any other device suitable for carrying or wearing on a user's person.

In some embodiments, customer card 135 may include certain components and circuitry or other technology to allow merchant hub(s) 124 to receive information from and track the location of the customer card 135 within a retail environment, including technology associated with using, for example, near field communication (NFC), RFD, infrared, electric fields, magnetic fields, WiFi, Bluetooth, etc. In other embodiments, a component may be affixed to customer card 135 in order to allow merchant hub(s) 124 to receive information from and track the location of the customer card 135 within a retail environment. In other embodiments, customer card 135 may be a passive, low-power device having no internal power source.

Network 140 may be any type of network configured to provide communications between components of system 100. For example, network 140 may be any type of network (including infrastructure) that provides communications, exchanges information, and/or facilitates the exchange of information, such as the Internet, a Local Area Network, a network based on NFC or using an optical code scanner, or other suitable connection(s) that enables the sending and receiving of information between the components of system 100. In other embodiments, one or more components of system 100 may communicate directly through a dedicated communication link(s).

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
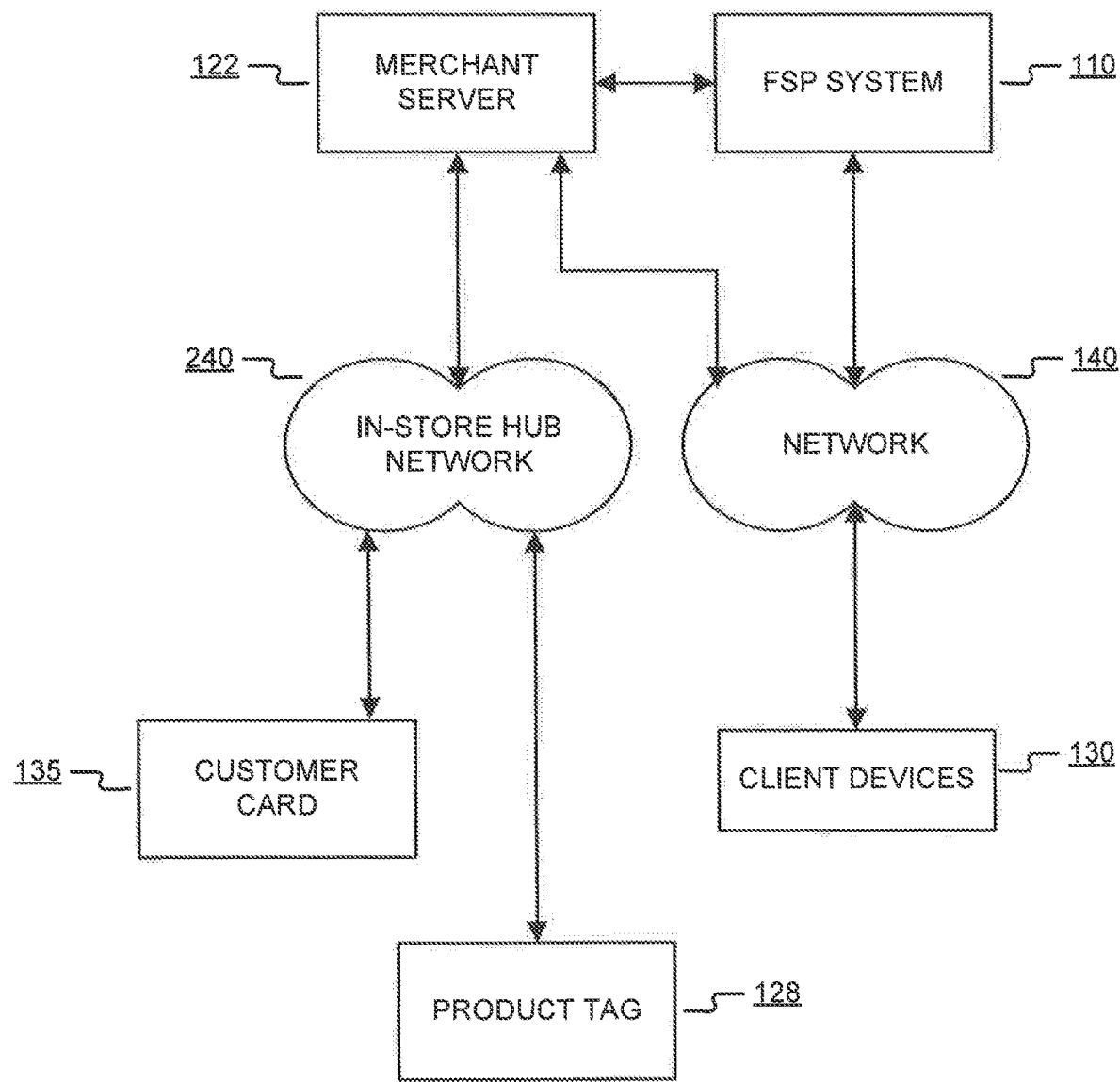
FIG. 2 is an exemplary network architecture, consistent with disclosed embodiments.

FIG. 2 shows an exemplary network architecture, consistent with disclosed embodiments. As further described herein, merchant system 120 may track the location of a user (e.g., by tracking the location of customer card 135 carried by user 131) and a plurality of store items 123 (e.g., by tracking the location of product tags 128 affixed to store items 123). For example, merchant system 120 may comprise one or more hubs 124 that communicate with and/or track the location of customer card 135 and product tags 128 over an in-store hub network 240 generated by the one or more hubs 124. In-store hub network 240 may enable communications using one or more near field communication (NFC), RFID, infrared, electric fields, magnetic fields, WiFi, Bluetooth, or any other suitable wireless technology suitable for performing operations consistent with disclosed embodiments.

In one embodiment, hubs 124 may be configured to emit communication signals to communicate with and or track the location of customer card 135 and product tags 128. Hubs 124 may also be configured to receive a communication from a customer card 135 (or client device 130) as well as product tags 128. Hubs 124 may communicate or otherwise emit a signal enabling a customer card 135 and/or product tag 128 to provide a responding communication. In one embodiment, hubs 124 may generate an electric field that may be amplified by the structural wiring of a merchant for example, and may sense user presence and user interaction by changes in the electric field. For example, a user (carrying customer card 135) alone, or in interaction with an item (including product tag 128) may interact with one or more electric fields creating a circuit of a particular capacitance, for example, that may induce a detectable change in the one or more electric fields. In another embodiment, hubs 124 may be configured to communicate using a plurality of communication signals of varying technology. In this embodiment, a location of a user 131 and an item 123 may be determined to varying degrees of specificity as desired.

Hub(s) 124 may enable an in-store hub network 240, and may determine, based on signals received over the in-store hub network 240, that a particular customer has interacted with a store item 123 when customer card 135 and a product tag 128 become linked. In one example, one or more hub(s) 124 may determine customer card 135 and a product tag 128 are linked based on a determination that customer card 135 and product tag 128 are within a predetermined proximity or communication range of each other. For example, hub(s) 124 may determine that customer card 135 and product tag 128 are within about 12 inches of each other, and may determine that the user has picked up store item 123. One of ordinary skill will understand that hub(s) 124 may determine the user has picked up store item 123 based on a determination that customer card 135 and product tag 128 are longer or shorter distances apart based on, for example, the desired sensitivity of hub(s) 124 to make such determinations. In other examples, hub(s) 124 may generate an electrical field, and hub(s) 124 may determine customer card 135 and product tag 128 are linked based on changes to the electrical field with respect to customer card 135 and store item 123 caused by user 131 being in close proximity to or touching store item 123. Interaction between a particular user 131 and an item 123 may be determined based on identifying characteristics particular to a customer card 135 and product tag 128 sensed or otherwise received by hub(s) 124. Hub(s) 124 may also be configured to identify a particular user 131 and the user's location separate from interaction with a product tag 128. According to some embodiments, hub(s) 124 may communicate with merchant server 122 over a Local Area Network (LAN) or direct connection separate from in-store hub network 240.

Upon a determination that user 131 has interacted with one or more store items 123, hub(s) 124 may transmit information associated with customer card 135 (such as user 131 identification information) and store item 123 (based on information provided by merchant system 120 in product tag 128) to merchant server 122. Merchant server 122 may be enabled to store and analyze the user interaction information associated with a user's 131 interaction with the one or more store items 123 and provide follow-on services or information, based in part on the user interaction information.

As discussed more fully herein, merchant server 122 may provide detailed product information of the same or similar store items 123 that a user 131 is or has interacted with. Other services may also be provided, such as offers or discounts, or options to request additional information or in-store assistance. Merchant server 122 may communicate with a user 131 via a client device 130 over a network 140. In some embodiments, merchant server 122 may communicate with a user 131 via customer card 135 over in-store hub network 240 or another network, such as network 140.

Merchant server 122 may also provide detailed analysis reports to merchant system 120 regarding a user's interaction with one or more store items 123. As also discussed more fully herein, merchant server 122 may provide reports or other data beneficial for merchant system 120 to determine how users interact with the merchant, and what merchant techniques may result in increased sales.

Merchant server 122 may also be enabled to provide certain information of a user, such as transaction information or other financial services related information to FSP system 110 to facilitate a purchase transaction. FSP system 110 may identify user 131 and other transaction credentials based on information stored in customer card 135 and other information provided by user 131 to authenticate a purchase transaction, for example. Merchant server 122 may also be enabled to offer various other services based on financial services related information related to a user 131 received from FSP system 110. FSP system 110 may also be enabled to communicate transaction or financial service related information directly to a client device 130 over network 140 to facilitate a transaction or provide other financial services.

Figure 3:
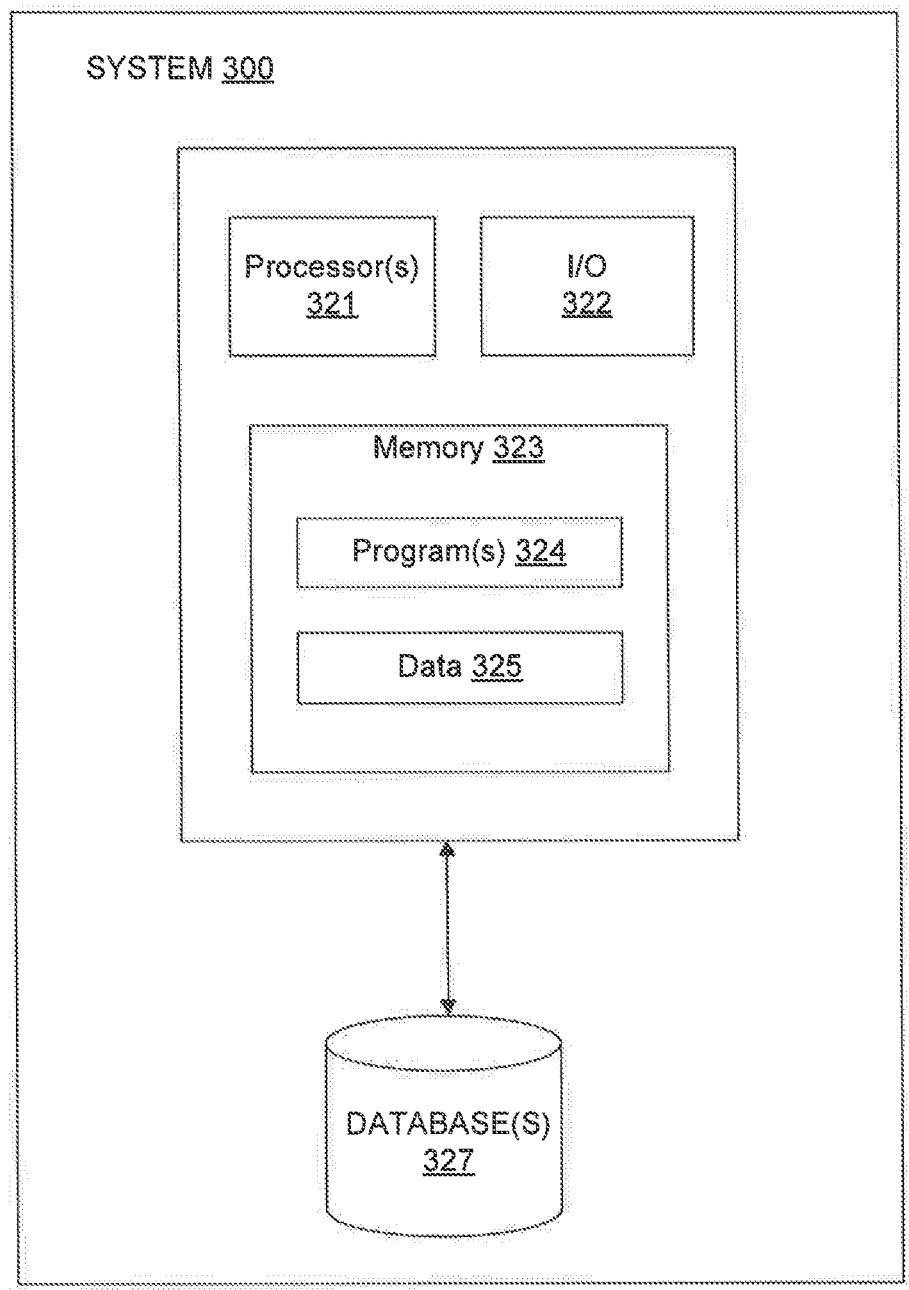
FIG. 3 is a diagram of another exemplary system, consistent with disclosed embodiments.

FIG. 3 shows an exemplary system 300 consistent with disclosed embodiments. Variations of exemplary system 300 may be one or more components of FSP system 110, merchant system 120 (such as merchant server 122, merchant hub 124 and payment terminal 126), and/or client device 130. In one embodiment, system 300 may comprise one or more processors 321, one or more input/output (I/O) devices 322, and one or more memories 323. In some embodiments, system 300 may take the form of a server. In some embodiments, system 300 may take the form of a mobile computing device (e.g., client device 130) such as a smartphone, tablet, laptop computer, or any combination of these components. Alternatively, system 300 may be configured as a particular apparatus, embedded system, dedicated circuit, and the like based on the storage, execution, and/or implementation of the software instructions that perform one or more operations consistent with the disclosed embodiments.

Processor 321 may include one or more known processing devices, such as a microprocessor from the Pentium™ or Xeon™ family manufactured by Intel™, the Turion™ family manufactured by AMD™, or any of various processors manufactured by Sun Microsystems, for example. The disclosed embodiments are not limited to any type of processor(s) otherwise configured to meet the computing demands required of different components of system 100. For example, processor 321 may also include one or more mobile device microprocessors when a variation of system 300 is client device 130.

Memory 323 may include one or more storage devices configured to store instructions used by processor 321 to perform functions related to disclosed embodiments. For example, memory 323 may be configured with one or more software instructions, such as program(s) 324 that may perform one or more operations when executed by processor 321. The disclosed embodiments are not limited to separate programs or computers configured to perform dedicated tasks. For example, memory 323 may include a single program 324 that performs the functions of system 300, or program 324 may comprise multiple programs. Memory 323 may also store data 325 that is used by one or more programs 324.

In certain embodiments, memory 323 may store sets of instructions for analyzing a user's 131 interaction with one or more store items 123 and providing real-time product information or assistance based on the determined interaction. These sets of instructions may be executed by processor(s) 321 to perform one or more communication and/or analysis processes consistent with disclosed embodiments. For example, the software may be run by a FSP system 110, merchant system 120, and/or client device 130 to provide real time product information and assistance.

I/O devices 322 may be one or more devices configured to allow data to be received and/or transmitted by system 300. I/O devices 322 may include one or more digital and/or analog devices that allow system 300 to communicate with and/or detect other machines and devices, such as other components of system 100. For example, when system 300 is FSP system 110 or merchant system 120, I/O devices 322 may include a network controller and/or wireless adaptor for communicating over the Internet. Further, in some embodiments, merchant system 120 may include one or more hubs 124 having I/O devices 322 configured to generate an electric field for tracking the location of and/or communicating with customer car(s) 135 and product tag(s) 128.

In some embodiments, I/O devices 322 may include a screen for displaying an interface. I/O devices 322 may also include one or more digital and/or analog devices that allow a user to interact with system 300 such as a touch-sensitive area, keyboard, buttons, or microphones. I/O devices 322 may also include other components known in the art for interacting with a user.

The components of system 300 may be implemented in hardware, software, or a combination of both hardware and software, as will be apparent to those skilled in the art. For example, although one or more components of system 300 may be implemented as computer processing instructions, all or a portion of the functionality of system 300 may be implemented instead in dedicated electronics hardware.

System 300 may also be communicatively connected to one or more database(s) 327. In one aspect, system 300 may include database 327. Alternatively, database 327 may be located remotely from the system 300. System 300 may be communicatively connected to database(s) 327 through network 140. Database 327 may include one or more memory devices that store information and are accessed and/or managed through system 300. By way of example, database(s) 327 may include Oracle™ databases, Sybase™ databases, or other relational databases or non-relational databases, such as Hadoop sequence files, HBase, or Cassandra. The databases or other files may include, for example, data and information related to the product information, user interaction information, purchase transaction data, etc. Database 327 may include computing components (e.g. database management system, database server, etc.) configured to receive and process requests for data stored in memory devices of database(s) 327 and to provide data from database 327.

Figure 4:
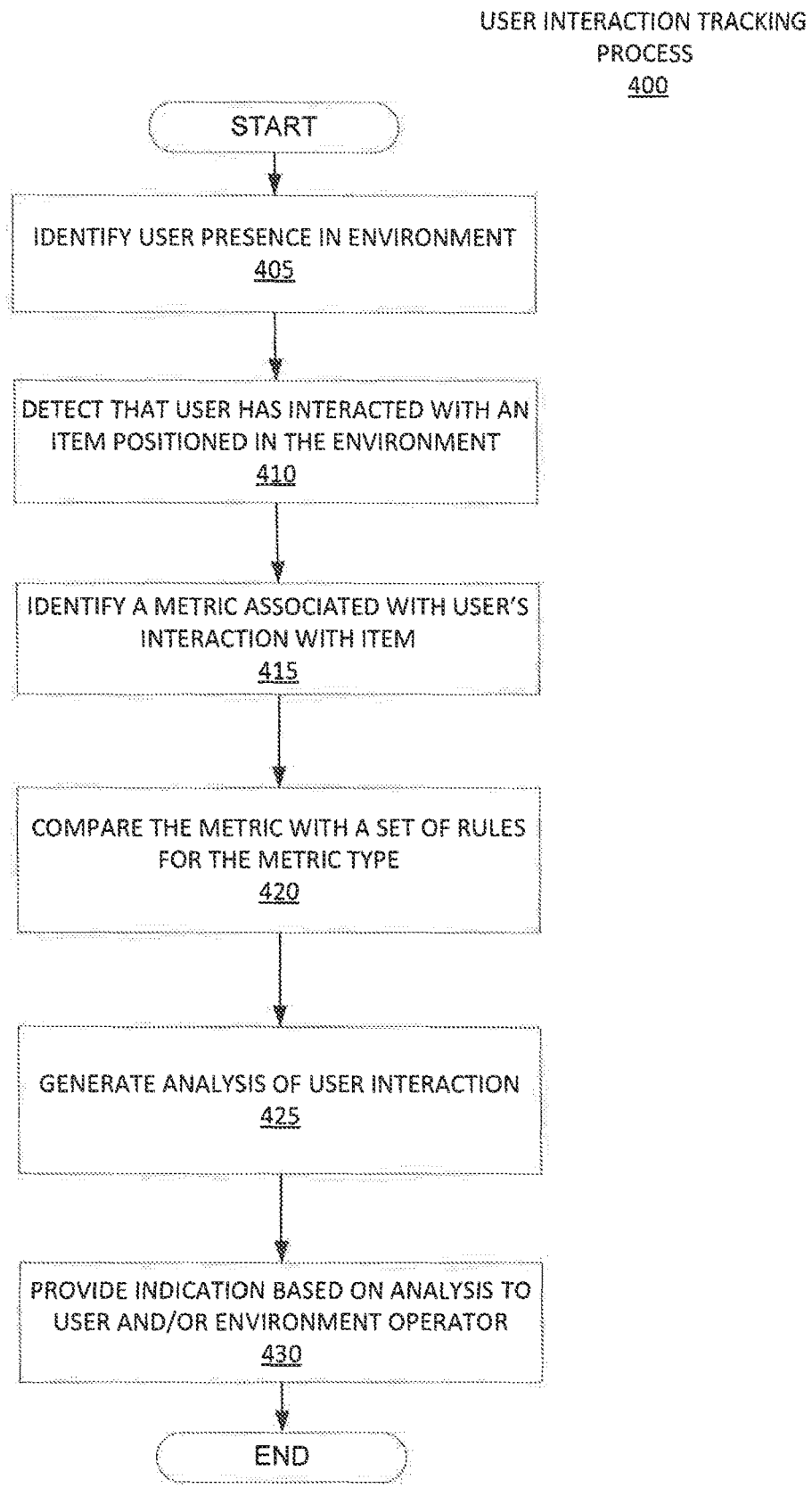
FIG. 4 is a flowchart of an exemplary user interaction tracking process, consistent with disclosed embodiments.

FIG. 4 shows a flowchart of an exemplary user interaction tracking process 400, consistent with disclosed embodiments. According to some embodiments, process 400 may be employed to monitor actions of user 131 when in a retail environment. The following process may also be implemented in a factory or warehouse setting or other environment for which it may be beneficial to track a user's interaction with an item or point of interest.

In step 405, merchant system 120 may identify a user's 131 presence in the particular environment, such as a brick-and-mortar store. In some embodiments, merchant system 120 may include one or more merchant hubs 124 configured to sense and monitor the presence of a customer card 135 carried by a user entering the store. In some embodiments, merchant hub 124 may ping or empower a customer card 135 to provide identification of the user 131 as the user enters and moves about the store. In some embodiments, customer card 135 may be enabled to communicate with merchant hub 124 through the use of a wireless radio frequency signal or through the use of an electric field or electromagnetic induction, or other wireless technologies.

Using the one or more hubs 124, merchant system 120 may be able to track a user's location within the store and movement throughout the store. Merchant system 120 may also be enabled to determine various other information associated with a user's movements and other interactions within the store. For example, merchant system may be able to determine a sequence of movement, or the duration and timing of movement of user 131. In some embodiments, a user's movements may be stored by merchant system 120 for follow-on analysis, while in other embodiments, merchant system 120 may enable real-time tracking of a user within the environment via a display or other interface, for example.

In step 410, the merchant system 120 may be enabled to detect that a user 131 has interacted with an item positioned in the environment. In some embodiments, user interaction may be determined by a communication between a customer card 135 carried by user 131 and one of a plurality of product tags 128 affixed to store items (or other points of interest) within the retail environment associated with merchant system 120. In some embodiments, customer card 135 is configured to communicate with a product tag 128 and then communicate the interaction with merchant hub 124. In other embodiments, merchant hub 124 may be able to sense an interaction or coupling of customer card 135 with a product tag 128, via changes in an electric field for example. In other embodiments, a product tag 128 may be enabled to communicate to hub 124 an interaction with a user's customer card 135.

As part of step 410, for example, consistent with disclosed embodiments, hub(s) 124 and/or merchant system 120 may be able to determine that a user 131 (with customer card 135) stood in front of a particular set of products or interacted with a store item 123, such as by picking up the item. Merchant system 120 may be enabled to determine and store numerous other data associated with the user interaction. For example, merchant system 120 may be able to determine the location of a store item 123 where the user interacts with the item 123. Additionally, merchant system 120 may be able to determine an amount of time the user 131 interacted with a store item 123 and whether the user 131 carried the item 123 away from its initial location, such as to purchase or compare the item with other items. Merchant system 120 may store this data for later analysis and/or analyze the data in real-time to track a user's 131 interaction with the store item 123.

At step 415, merchant system 120 may identify a metric associated with a user's interaction with an item 123. A metric in the disclosed embodiments may include any type of data that may be useful or beneficial to a merchant for performing the disclosed functions. For example, a metric may include the duration of time a user 131 spent interacting with an item 123 at its initial location or a subsequent location, whether user 131 carries the item 123 away from the initial location, other locations the user 131 carries an item 123 (and whether the user misplaces an item 123), whether the user ultimately purchases the item 123, data associated with other items the user 131 has interacted with in the past or on the current visit, and numerous other contemplated metrics. In the disclosed embodiments, merchant system 120 may receive and store numerous data points on a particular user's interaction with an item in the merchant environment. A metric may be identified directly based on a user's sole interaction with an item 123, or may be identified based on an analysis over many data points associated with a user 131 or even other users. In some embodiments, a metric may be identified based on data received from various other sources, such as other merchant systems 120, a FSP system 110 or other user accounts such as a social media account.

At step 420, merchant system 120 compares one or more of the identified metrics with a set of rules for the metric type. The set of rules may be stored in a database 327, for example, of merchant system 120 and may be grouped or categorized according to any known method. As part of step 420, merchant system may compare one or more of the identified metrics with a set of rules to determine a degree of user interaction with the item and/or to determine whether to engage the user 131.

For example, if an identified metric is of a type corresponding to a duration of a user's interaction with an item 123 near the item's initial location, merchant system 120 may access a set of rules associated with the metric type. In one embodiment, merchant system may determine, based on the comparison, whether the identified duration exceeds a threshold or falls within some other range. For instance, if the identified duration exceeds a threshold, the rule may indicate to merchant system 120 that user 131 may need assistance with the item 123, or that the user 131 has an interest in the item 123. The set of rules may then provide merchant system 120 with a follow-on action or other analysis, described in further detail below. The threshold and the range may be learned by the merchant system based on prior user interactions or may be predetermined by merchant system 120.

As another example, if an identified metric is of a type corresponding to other items 123 that a user has interacted with during the current visit at the merchant, merchant system 120 may compare an item list and number of items with a set of rules corresponding to that type of metric. An example of one such rule may include one directed to a threshold number of items of a particular category. Merchant system 120 may determine, based on a comparison with a set of rules, that a user 131 may be purchasing items for a specific project, or engaging in comparison shopping. The set of rules may then provide merchant system 120 with a follow-on action or other analysis, described in further detail below.

In another embodiment, an identified metric may be based on a user's 131 interaction with a particular type or brand of product over a period of time. For example, merchant system 120 may be able to determine that a particular user has handled a type of item, such as sunglasses, for example, several times over a predetermined period of time. A set of rules associated with this metric may enable merchant system 120 to determine whether the particular user is in the market for new sunglasses. Such a determination may provide merchant system 120 with a follow-on action, such as for example, pushing an offer or discount to the user to potentially entice a sale, as discussed below.

In another embodiment, an identified metric may be based on a user's 131 interaction with a number of items 123 of a particular pattern or duration. For example, one metric may identify that user 123 has interacted with a number of items 123 of a particularly short duration. A set of rules corresponding with this metric type may provide a threshold number of interactions and a threshold average duration of interaction for example and perhaps a category of items associated with the interactions. Merchant system 120 may compare the identified metric with this set of rules to interpret a particular behavior of user 131. For example, based on a comparison with the set of rules, merchant system may be able to determine whether a user 131 is merely browsing, or may need assistance locating a particular item.

Many other potential metrics may be identified by merchant system 120 in view of the above examples. The above examples are in no way exhaustive of the potential metrics that a merchant system 120 may be able to identify. Additionally, each merchant system 120 may have particularly unique needs based on a type of product or service offered or the nature of customers interacting with merchant 120. In the above embodiments, a merchant system 120 may be enabled to predetermine a number of metrics that may be beneficial to identify in view of the particular interests of the merchant. In some embodiments, a set of rules and/or a listing of predetermined metric types may be dynamically adjustable and configured based on gathered user interaction data and dynamic interpretation of the data.

At step 425, merchant system 120 may generate an analysis of a user's 131 interaction with a particular item 123 or the user's 131 visit to the merchant generally. At step 425, merchant system 120 may analyze the result of the comparison in step 420 in its analysis. In one embodiment, an analysis of a user's 131 interaction may be based entirely on the result of the comparison in step 420. For example, a generated analysis may be that a user needs assistance when a result of the comparison in step 420 indicates that a user may need assistance. In another embodiment, merchant system 425 may access other data to generate the analysis of a user interaction. For example, merchant system 120 may access data corresponding to prior user interaction with the merchant system 120 and/or a particular item 123. For example, in one embodiment, even if a result of the comparison in step 420 identifies that a user 131 may need assistance with a particular item 123, merchant system may determine that a user 131 has previously interacted with the item 123 during other visits and that the user 131 purchased the item 123 on a previous visit to the merchant. Based on this analysis, merchant system 120 may determine that a user 131 does not need assistance.

In other embodiments, merchant system 120 may generate analysis identifying a user's 131 interaction with a current item that is of a different make than a previous item recently interacted with or purchased by user 131. In this embodiment, merchant system may generate analysis identifying a user's loyalty to a product or a purchasing decision based on other factors, such as price or product placement. Merchant system 120 may be enabled to access prior user interaction data to determine certain conditions that lead to a user's purchase of a particular item, whether it be the purchase of the product based on a prominent or strategic placement of the item 123 or based on a particular special price or other individualized promotion, etc.

As part of step 425, merchant system 120 may analyze numerous data of different types or form to generate the analysis of the user's interaction with a particular item. Other external data may also be analyzed as part of step 425, such as data from other merchant systems or other user accounts, including purchase history received from a FSP system 110. The analysis generated in step 425, may include numerous analytical assessments based on individual preferences of a particular merchant system 120 and may be dynamically learned and adjusted over time.

At step 430, merchant system 120 may provide an indication to a user 131 or an interface of merchant system 120 based on the generated analysis. In one embodiment, as part of step 430, merchant system 120 may generate information for display on a merchant system 120 dashboard or other interface. In this embodiment, merchant system 120 may provide real time analysis of particular user 131 interactions with a merchant. For example, an entity or operator associated with merchant system 120 may be enabled to view a display providing an indication of various users positioned in the merchant environment and some other indication of a particular nature of user interaction.

For example, in one embodiment, merchant system 120 may be provided with an interface that highlights various users 131 as they interact with the merchant store. In this embodiment, based on the analysis from step 425, an indication may be displayed for each user 131 that the merchant system 120 determined may need assistance with a particular item 123, based on the analysis of step 425. The display or interface may also provide an indication of the user's position within the store to enable the merchant to provide prompt attention.

In other embodiments, other indications may also be provided to an interface of the merchant system 120 such as an indication of those users 131 that have significant purchase history with the merchant system 120. Merchant system 120 may thus enable special attention to be paid to those valued users who provide significant business to the merchant. Another indication that may be provided to merchant system 120 may be a notification associated with user misplacement of an item 123. Thus in one embodiment, merchant system may be notified when certain items 123 may have been relocated and misplaced by a user 131 enabling merchant to keep track of and organize its inventory. Numerous other merchant system indications may be contemplated based on the set of identified metrics and rules associated with the metrics, for example. The type and nature of the notification may be controlled by a merchant system 120 to suit the individual needs of the merchant system 120.

In step 430, merchant system 120 may also provide an indication to a user 131 via a user's client device 130 for example. In one embodiment, merchant system 120 may provide the indication to user 131 by means of a push notification within a mobile device software application provided installed on client device 130 or otherwise accessible by client device 130. Additionally or alternatively, merchant system 120 may provide the indication via SMS message, e-mail, or any other real-time messaging system. In some embodiments, merchant system 120 may access the user profile of user 131 to identify user 131's communication preferences and provide the analysis according to the user 131's preferred method. In another embodiment, merchant system 120 may enable a user 131 to configure the type and nature of indications the user 131 may desire to receive according to the above embodiments. For example, a user 131 may be enabled to select from a menu of options displayed on a client device 130, for example, which indications the user would like to receive.

In another embodiment, an indication may be provided to a user via a display or other interface device provided by merchant system 120. For example, in one embodiment, a display may be provided on a shelf or in an aisle of the merchant that may grab a user's 31 attention as he or she interacts with an item 123.

An example of an indication provided to a user as part of step 430 includes an indication requesting whether the user desires in-store assistance or other information that may help inform the user's decision. In one embodiment, a user 131 may be enabled to request assistance or additional information by interacting with an interface of client device 130 or with a display or other interface provided by merchant system 120. In one embodiment, merchant system 120 may be notified of the request for user assistance and may be enabled to designate an employee to assist the user 131. In another embodiment, merchant system 120 may be enabled to identify product information related to an item 123 and or similar items 123 and communicate such information to the user 131 in real-time. Again, this information may be provided via a client device or a display or other interface provided by merchant system 120 and may include user reviews of the identified item 123 or similar items. In one embodiment, the product information may provide a comparison between an identified item 123 and other similar items and may alert a user of the more popular item and/or prior user purchase history of the identified item or similar items.

In another aspect of this embodiment, an indication to a user 131 may request a review of the identified item 123 or similar items. For example, based on an analysis in step 425 that a user 131 previously purchased a similar item of different make, user 131 may be notified and/or requested to provide a reason for the current interaction decision. In one embodiment, user 123 may be encouraged to provide a review of the previously purchased item that led to a different purchasing decision for user 131.

In another embodiment, an indication to a user 131 may include an individualized offer or product offering. For example, based on an analysis of the user interaction in step 425, merchant system 120 may provide a special discount to a user 131 based on the user's prior loyalty to a product, or based on other factors to initiate a sale. The indication in step 430 may also include a notification of other items that may be of interest to the user 131 as determined by the particular items user 131 has recently interacted with or a category of items the user 131 has interacted with.

Numerous other indications to be provided to a user 131 may be contemplated based on a set of identified metrics and rules associated with the metrics, for example, as may be determined by merchant system 120. The type and nature of the notification may be controlled by a merchant system 120 to suit the individual needs of the merchant system 120.

In one embodiment, the various data gathered in user interaction process 400 may be analyzed, sorted and stored by merchant system 120. This data may inform merchant system 120 of various user tendencies or aggregate user behavior concerning a user's interaction with a merchant and the user's purchasing decisions. The data may also be used by merchant system 120 to further tailor the studied metrics and rules associated with these metrics. These metrics and rules may be dynamically adjusted to fine tune the user tracking process. In this manner, a merchant system 120 can evaluate real-time and historical data to inform advertising, product placement, or other tactics to improve sales.

Figure 5:
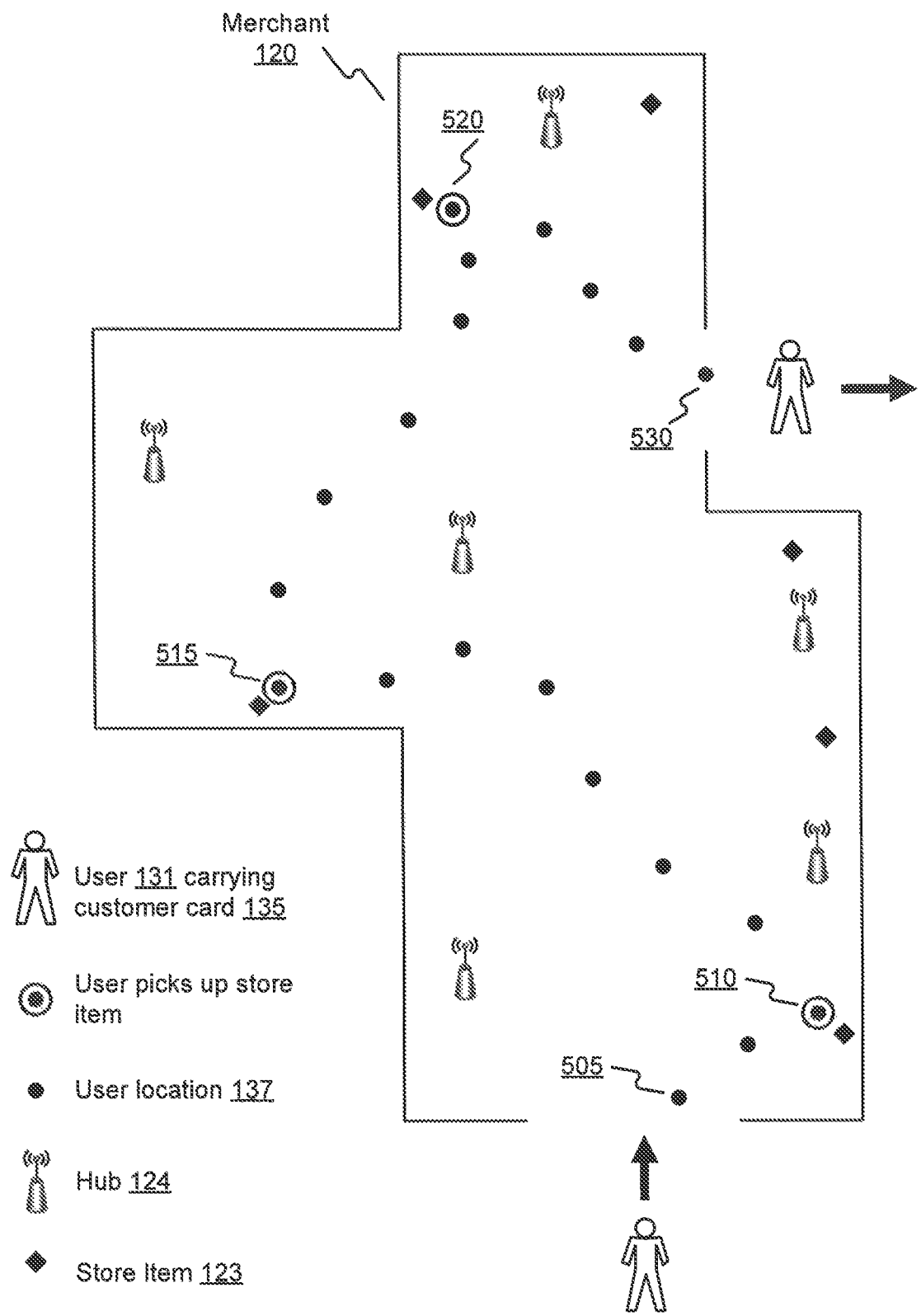
FIG. 5 illustrates an exemplary environment, consistent with disclosed embodiments.

FIG. 5 illustrates an exemplary retail environment, consistent with disclosed embodiments. Consistent with disclosed embodiments, one or more hubs 124 may detect that a user 131 has entered a retailer environment using in-store hub network 240 (event 505). Hub(s) 124 may communicate the event to merchant server 122 (via, e.g., network 140), which may perform operations described in detail with respect to FIG. 4 or FIG. 6.

Hub(s) 124 may further detect that a user 131 has stood in front or otherwise interacted with an item 123 of a particular set of products for a predetermined amount of time (event 510). In such an event, hub(s) 124 may detect various information related to the interaction consistent with disclosed embodiments (such as a location or duration etc.) along with information regarding the detected customer card 135 and set of items 123 associated with a tag 128. Consistent with the disclosed embodiments, merchant system 120 may identify a particular metric and compare and analyze the user interaction and, in turn, provide user 131 with an indication (via, e.g., client device 130) based on the analysis (steps 415, 420, 425, and 430 of FIG. 4). The indication may include, for example, an indication of a customer review for each product in the set of products and/or a request for information concerning the user's purchasing decision, or a special offer concerning a particular item 123, for example.

Hub(s) 124 may further detect that a user 131 has interacted with one or more store additional items 123 (events 515 and 520). Similar to the above, hub(s) 124 may communicate the event to merchant system 120 which may perform operations further described with respect to, for example, FIGS. 4 and 6. Finally, hub(s) 124 may detect that that user 131 has crossed a threshold near the entrance/exit of the retail environment (event 530) and cease monitoring customer card 135. According to some embodiments, hub(s) may determine that user 131 was carrying one or more store items 123 when the customer exited the retailer environment (or entered a purchasing area of the retail environment (event 530)), as described in further detail with respect to FIG. 7, for example. Upon detecting event 530, hub(s) 124 may communicate the event to FSP system 110 (via, e.g., merchant server 122 over network 140), which may conduct a corresponding financial transaction from an account of user 131 to fund the purchase of the one or more store items 123 carried out of the retailer environment by user 131.

Figure 6:
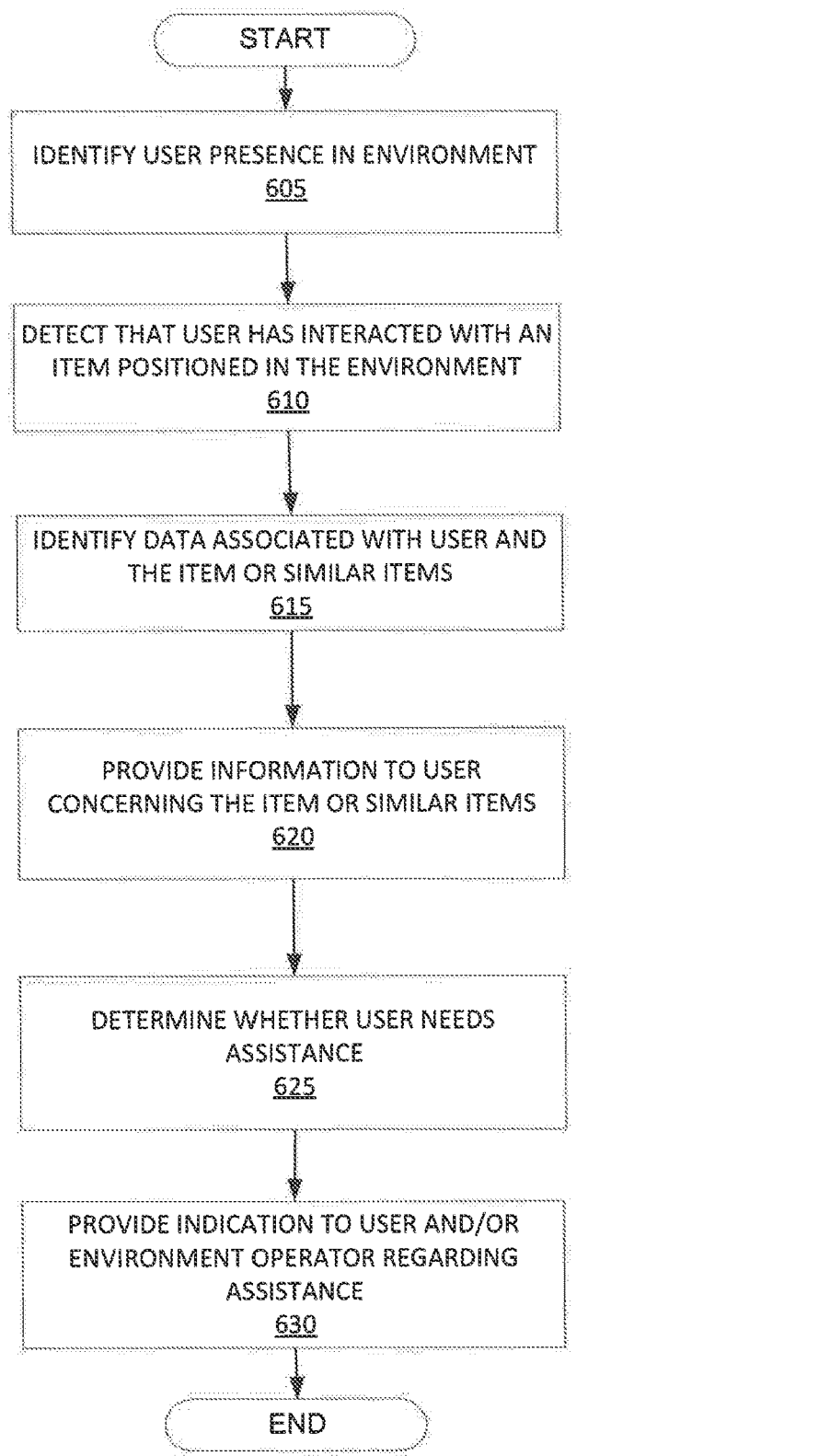
FIG. 6 is a flowchart of an exemplary user self-assist process, consistent with disclosed embodiments.

FIG. 6 is a flowchart of an exemplary self-assist process 600 according to the disclosed embodiments. Process 600 is similar in operation to process 400 and is directed more specifically to the ability of a merchant system 120 to provide assistance to a user 131 while interacting with a retail environment. Process 600 may similarly be performed and executed by the system components of FIG. 1 as described with respect to FIG. 4.

Steps 605 and 610 may be similarly executed as described above with respect to steps 405 and 410, with respect to the exemplary user interaction tracking process 400. Thus, additional disclosure of these steps is omitted for succinctness.

In step 615, merchant system 120 may receive a communication signal and identify, from the communication signal, data associated with a user 131 and one or more items 123 that the user interacts with (based on the communication between a tag 128 and customer card 135). In this embodiment, merchant system 120 may identify a user based on information stored in a customer card 135, as detected by a hub 124, as similarly described above. Additionally, merchant system 120 may store detailed item information for an item 123 associated with a particular tag 128, for example. Tag 128 may include certain data to assist merchant system 120 and or customer card 135 to identify relevant item identification information.

In step 620, merchant system 120 may access a database of item 123 and user 131 information. Merchant system 120 may evaluate the item 123 and user 131 information to determine what information to provide to user 131 concerning the item 123. Additionally, in one embodiment, a client device 130 executing instructions corresponding to a merchant application installed on the client device 130, or otherwise accessible to client device 130, may be able to access certain of the item information hosted by merchant system 120.

As part of step 620, merchant system 120 may provide item information to the user 131 concerning the item 123 that a user is interacting with, as well as information related to other items. As discussed above, the information provided to a user 131 may be via a client device 130 or some other display or interface provided by merchant system 120. As similarly described with respect to the user tracking process 400 and step 430 in particular, the information provided to a user 131 may be any relevant information that may inform or assist a user 131 with a purchasing decision. For example, in some embodiments, the provided information may include additional information concerning the particular item 123, such as other consumer reviews, or more detailed information concerning the product. In another embodiment, the provided information may include information concerning other similar items that a user 131 may also be interested in. The provided information may be tailored based on past user interactions and purchasing information, as similarly described with respect to FIG. 4. The provided information may also include an option for additional information concerning the item 123 or a request for in-store assistance.

Thus, according to this embodiment, a merchant system 120 may automatically provide item information to a user 131 in step 620 without performing other analytical operations associated with steps 415, 420 and 425, for example. In one embodiment, self-assist process 600 may be executed in conjunction with or in lieu of user interaction tracking process 400.

In step 625, merchant system 120 may determine whether a user 131 has requested additional information or n-store assistance. For example, in one embodiment, a display provided as part of client device 130 may enable a selection by a user of a request to receive additional item information. In another embodiment, a display or interface provided by merchant system 120 may also be used to communicate with a user 131. Additional information may include more detailed product information or more detailed customer reviews. In another embodiment, additional information may include expert advice concerning the use or nature of a particular item 123 to help inform a user. Additionally, a user 131 may be enabled to select to receive in-store assistance concerning the particular item 123.

As a result of step 625, merchant system 120 may provide the additional requested information and/or may designate in-store personnel to assist user 131 concerning the item 123. As part of step 630 an indication may be provided to a user 131 that in-store personnel has been designated to help, and may provide an estimated time for the help to arrive. As discussed above with respect to FIG. 4, merchant system 120 may include a dashboard or interface indicating to merchant personnel that a user has requested in-store assistance and who has been assigned to assist the user 131.

In this manner, a merchant system 120 may be enabled to provide an improved customer experience that may result in increased sales. By detecting a user's interaction with a particular item, a user 131 may be provided with additional information to facilitate or encourage the purchase of a particular item, or encourage a different purchase. The type of data stored and analyzed by merchant system 120 with respect to FIG. 4, may also be used with respect to steps 615 and 620 to tailor the particular information to be provided to a user as may be determined to potentially increase sales.

Figure 7:
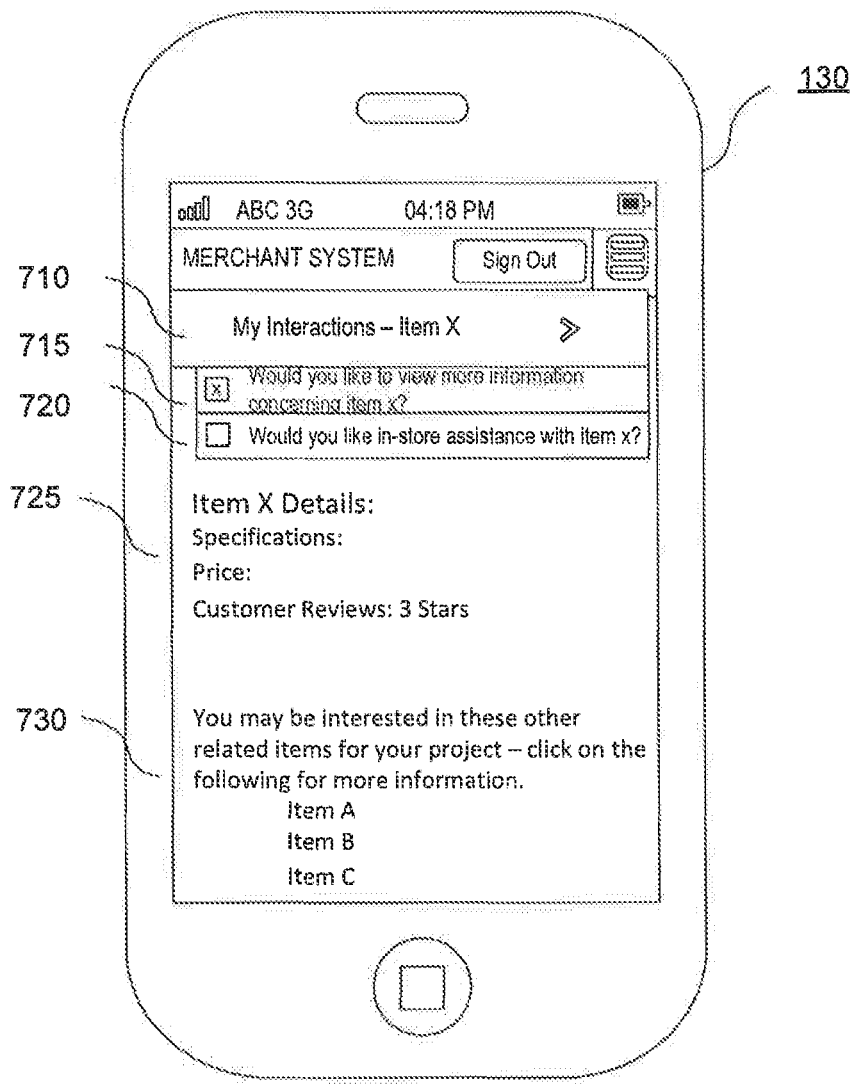
FIG. 7 is a diagram of an exemplary interface displaying an exemplary indication on a client device, consistent with disclosed embodiments.

FIG. 7 is a diagram of an exemplary interface displaying an indication provided on a client device 130, consistent with disclosed embodiments, such as described with respect to Steps 430 and 630, of FIGS. 4 and 6, respectively. For example, client device 130 may include an interface (via, e.g., an app associated with merchant system 120) that includes a graphical image identifying, for example, a main area identifying a user's 131 interaction with a particular item 'x' 123 (area 710), an area enabling user selection of additional information concerning item 'x' (area 715), an area enabling user selection for requesting in-store assistance (area 720), an area providing detailed information concerning item 'x' (area 725) and an area providing other recommendations to user 131 concerning additional items (area 730). Numerous other variations of interface areas are contemplated for organizing and displaying a variety of indications to a user 131 in view of the above disclosure.

Figure 8:
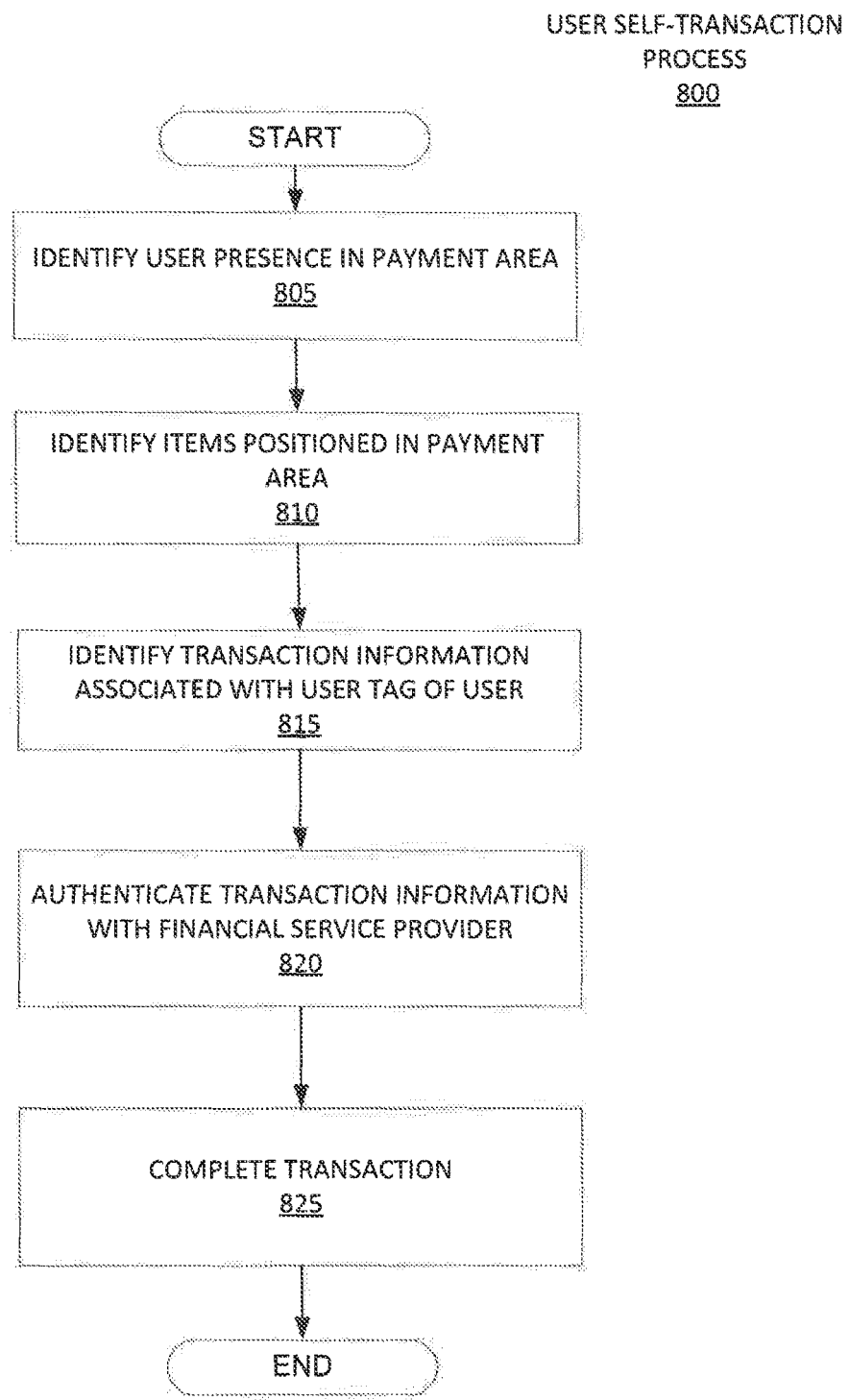
FIG. 8 is a flowchart of an exemplary user self-transaction process, consistent with disclosed embodiments.

FIG. 8 is a flow chart of an exemplary self-transaction process 800 consistent with the disclosed embodiments. The exemplary merchant system 120 enables an improved transaction process, discussed in further detail below. The self-transaction process 800 may be executed using the components of merchant system 120 as described throughout.

In step 805, merchant system 120 may determine a user's 131 presence in a payment area of a merchant system. A payment area may include a payment terminal 126 that may include a hub 124 or other system for detecting a user's 131 presence within the payment area as similarly described above with respect to step 405. For example, in one embodiment, a hub 124 provided at or in the vicinity of a designated payment area may be configured to detect a user's 131 presence within the payment area.

Additionally, with respect to step 810, a hub 124 may also be configured to identify one or more items 123 present on or associated with a user in the payment area. As discussed above, a hub 124 may be configured to sense or detect the presence of an item 123 based on a communication received from a tag 128 affixed to an item 123, or based on communication received from a customer card 135 indicating a link with a tag 128 affixed to an item 123.

In one embodiment, as part of operations 805 and 810, the user 131 and item 123 information may be determined solely based on the presence of the user 131 and the items 123 within the payment zone. In one embodiment, a hub 124 may be provided on the surface of a floor in the payment zone, such that a user's contact with the hub-configured surface enables hub 124 to sense a user 131 and each item 123 within the payment zone. In the disclosed embodiments, no other interaction with a checkout assistant or individual scanning of items 123 may be necessary.

As part of operation 810 or 815, a merchant system 120 may determine a transaction sum based on the identified items user 131 transported into the payment area. As part of operation 815, merchant system 120 may initiate a purchase transaction. In one embodiment, merchant system 120, via hub 124 e.g., may access transaction information associated with the user and a financial services account. Such transaction information and financial services account information may be received from customer card 135 detected in the payment area or from a client device 130.

As part of operation 820, merchant system 120 may communicate with a FSP system 110, over a network 140 e.g., to authenticate the financial services account information associated with a user 131. As part of operation 820, merchant system 120 may prompt user 131 to enter one or more various secure authentication information to facilitate the transaction. In one embodiment, a user may be enabled to enter the authentication information using a client device 130 associated with the user 131. In another embodiment, a payment zone may be enabled to sense authentication information from a client device 130 (or customer card 135) present in the payment zone, without any user interaction. In another embodiment, a payment terminal 126 may also be provided to receive secure authentication information from the user 131. The various secure authentication information may include a PIN, a password, or some other biometric data. FSP system 110 may then authenticate the received user information and secure authentication information from merchant system 120 to authenticate the user. As part of the authentication process, a merchant system 120 may also verify that user 131 has the means to complete the transaction, including a determination of sufficient funds or an available credit amount, for example.

FSP system 110 may provide an indication of a successful authentication of user 131 to merchant system 120. In step 825, upon receiving a successful authentication indication from FSP system 110, merchant system 120 may complete the transaction. The self-transaction process 800 may facilitate an improved consumer experience by enabling a checkout process without requiring user interaction or individual scanning of items 123 by a user 131 within the payment zone, as detailed above. Thus, once the transaction is completed in step 825, a user 131 may simply exit the merchant store.

In another embodiment, similar to the above, a client device 130 may be configured to determine a transaction sum of a plurality of items 123 a user 131 wishes to purchase. Client device 130 may be configured to detect items 123 based on a communication with product tags 128, or may otherwise be enabled to determine a transaction sum based on information received from a hub 124 or merchant server 122 or based on information entered by a user 131 using client device 130. A user 131, using client device 130, may then be able to complete a transaction using an app associated with the merchant 120 and/or an FSP 110, for example. In this embodiment, a transaction may be completed without requiring a user to enter the payment zone described above.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone. Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A server system for analyzing user interaction in an environment, comprising:
    a memory storing a set of instructions; and
    at least one processor configured to execute one or more of the set of instructions to:
        determine a first user interaction with a first item positioned in the environment based on a communication signal received from a hub physically located in the environment, the communication signal indicating an item tag associated with the first item is linked with a user tag associated with the user, wherein the linkage is based on communications received by the hub from the item tag and the user tag;
        identify, based on the communication signal received from the hub, at least one metric associated with the first user interaction with the first item, the at least one metric being derived from a duration and timing of movement of the user;
        compare the at least one metric with a set of rules associated with a type of the at least one metric to determine whether the at least one metric falls within a range of values that is dynamically determined based on prior second user interactions with second items in the environment, wherein the set of rules is dynamically adjusted based on aggregate user behavior derived from an analysis of real-time and historical data associated with the user; and
        provide an indication of the nature of the interaction, based on the comparison, to a display device.

2. The server system of claim 1, wherein the server system is configured to communicate with the hub, and the hub is configured to detect positioning of the user tag relative to the item tag.

3. The server system of claim 2, wherein the hub is configured to enable a hub network and to detect locations of the user tag and the item tag over the hub network.

4. The server system of claim 1, wherein the user tag and the item tag are determined to be linked when they are within a communication range of each other.

5. The server system of claim 4, wherein the item tag is batteryless.

6. The server system of claim 5, wherein the communication range includes physical contact up to 12 inches.

7. The server system of claim 3, wherein the user tag and the item tag are determined to be linked based on changes in an electric field provided by the hub network.

8. The server system of claim 4, wherein the user tag and the item tag are determined to be linked based on communication enabled by at least one of an infrared signal, a radio wave signal, or electromagnetic induction.

9. The server system of claim 1, wherein the at least one metric includes a duration of user interaction.

10. The server system of claim 9, wherein the set of rules comprises at least one rule for determining whether the user may require assistance.

11. The server system of claim 1, wherein the at least one metric includes historical data concerning the first user interaction with the first item.

12. The server system of claim 10, wherein the one or more processors are further configured to execute one or more of the set of instructions to:
    provide the indication to a display device comprising a client device controlled by the user, the indication including first information concerning the first user interaction and enabling a user selection to request second information concerning at least one of the first item or in-person assistance.

13. The server system of claim 10, wherein the one or more processors are further configured to execute one or more of the set of instructions to:
    provide the indication to a display device comprising an environment-controlled interface, the indication including third information identifying the user and a location of the user, and an indication that the user requires in-person assistance.

14. The server system of claim 2, wherein the one or more processors are further configured to execute one or more of the set of instructions to:
    identify a transaction amount based on a determination of the first item being positioned in a predetermined area of the environment;
    receive transaction information from the user tag; and
    authenticate the transaction information with a financial services provider.

15. A system for sensing user interaction with one or more items in an environment, the system comprising:
    at least one item tag associated with at least one of the one or more items, the at least one item tag being configured to indicate identification information corresponding to the at least one item;

at least one hub configured to provide a sensor network, the at least one hub being configured to detect, via the sensor network, the at least one item tag and receive identification information of the at least one item tag; wherein the hub is further configured to detect, via the sensor network, at least one user tag and receive user identification information of a user associated with the at least one user tag and to determine when the at least one user tag is positioned in close proximity to the at least one item tag; and a server system comprising a memory storing a set of instructions and at least one processor configured to execute one or more of the set of instructions to:

determine a first user interaction with the at least one item based on a communication signal received from the at least one hub, the communication signal indicating the at least one user tag is in close proximity to the at least one item tag, wherein the linkage is based on communications received by the hub from the item tag and the user tag;

identify, based on the communication signal, at least one metric associated with the first user interaction, the at least one metric being derived from a duration and timing of movement of the user;

compare the at least one identified metric with a set of rules associated with a type of the at least one metric to determine whether the at least one metric falls within a range of values that is dynamically determined based on prior second user interactions with second items in the environment, wherein the set of rules is dynamically adjusted based on aggregate user behavior derived from an analysis of real-time and historical data associated with the user; and provide to at least one of a client device or an interface, an indication of a nature of the user interaction based on the comparison.

16. The system of claim 15, wherein the at least one user tag and the at least one item tag are determined to be in close proximity to each other when they are less than or equal to 12 inches apart.

17. The system of claim 16, wherein the at least one hub is configured to detect positioning of the at least one user tag relative to the at least one item tag.

18. The system of claim 17, wherein the at least one hub is configured to enable a hub network and to detect a location of the at least one user tag and the at least one item tag over the hub network.

19. The system of claim 18, wherein the at least one user tag and the at least one item tag are determined to be in close proximity to each other based on changes in an electric field provided by the hub network.

20. The system of claim 17, wherein the at least one user tag and the at least one item tag are determined to be in close proximity to each other based on communication enabled by at least one of an infrared signal, a radio wave signal, or electromagnetic induction.

* * * * *